US010001978B2

(12) United States Patent
Cimadamore et al.

(10) Patent No.: US 10,001,978 B2
(45) Date of Patent: Jun. 19, 2018

(54) TYPE INFERENCE OPTIMIZATION

(71) Applicant: Oracle International Corporation, Redwood Shores, CA (US)

(72) Inventors: Maurizio Cimadamore, Dublin (IE); Daniel Smith, Spanish Fork, UT (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 14/973,129

(22) Filed: Dec. 17, 2015

(65) Prior Publication Data

US 2017/0131982 A1    May 11, 2017

Related U.S. Application Data

(60) Provisional application No. 62/253,855, filed on Nov. 11, 2015.

(51) Int. Cl.
*G06F 9/45* (2006.01)
*G06N 5/00* (2006.01)

(52) U.S. Cl.
CPC ............ *G06F 8/437* (2013.01); *G06F 9/4491* (2018.02); *G06N 5/003* (2013.01)

(58) Field of Classification Search
CPC .................................. G06F 8/437; G06N 5/003
See application file for complete search history.

(56) References Cited

U.S. PATENT DOCUMENTS

| 5,339,420 | A  | * | 8/1994 | Hoxey | ..................... | G06F 8/443 |
| | | | | | | 717/151 |
| 5,812,850 | A  | * | 9/1998 | Wimble | .............. | G06F 11/3624 |
| | | | | | | 714/E11.209 |
| 6,539,541 | B1 | * | 3/2003 | Geva | ........................ | G06F 8/443 |
| | | | | | | 712/233 |
| 9,557,974 | B2 | * | 1/2017 | Goetz | ..................... | G06F 8/437 |
| 2003/0046668 | A1 | * | 3/2003 | Bowen | ................. | G06F 17/5045 |
| | | | | | | 717/131 |
| 2004/0252109 | A1 | * | 12/2004 | Trent, Jr. | ............. | G06F 3/03547 |
| | | | | | | 345/174 |
| 2006/0174227 | A1 | * | 8/2006 | Bearman | .................. | G06F 8/433 |
| | | | | | | 717/127 |
| 2007/0018982 | A1 | * | 1/2007 | Brooks | ..................... | G01D 7/10 |
| | | | | | | 345/440 |
| 2011/0161266 | A1 | * | 6/2011 | Gillespie | .................. | G06F 17/11 |
| | | | | | | 706/17 |
| 2011/0167404 | A1 | * | 7/2011 | Liu | ............................ | G06F 8/33 |
| | | | | | | 717/106 |
| 2011/0258593 | A1 | * | 10/2011 | Ng | ............................ | G06F 8/437 |
| | | | | | | 717/106 |

(Continued)

*Primary Examiner* — Chameli Das
(74) *Attorney, Agent, or Firm* — Invoke

(57) ABSTRACT

Operations include (a) identifying bounds corresponding to two or more inference variables corresponding to a nested method invocation context, (b) determining that resolution of a first inference variable can be determined as a function of a resolution of a second inference variable, (c) propagating bounds corresponding to the second inference variable from the nested method invocation context to an outer method invocation context without propagating bounds corresponding to the first inference variable, (d) resolving a constraint set to resolve the second inference variable, and (e) resolving the first inference variable based on the resolution of the second inference variable.

22 Claims, 6 Drawing Sheets

(56) References Cited

U.S. PATENT DOCUMENTS

| | | | | |
|---|---|---|---|---|
| 2011/0271258 A1* | 11/2011 | Park | ........................ | G06F 8/33 |
| | | | | 717/127 |
| 2012/0317065 A1* | 12/2012 | Bernstein | ............... | G06N 7/005 |
| | | | | 706/46 |
| 2014/0310205 A1* | 10/2014 | Nisted | ................ | G06Q 30/0621 |
| | | | | 706/11 |
| 2016/0170724 A1* | 6/2016 | Mahaffey | ................ | G06F 8/315 |
| | | | | 717/151 |

* cited by examiner

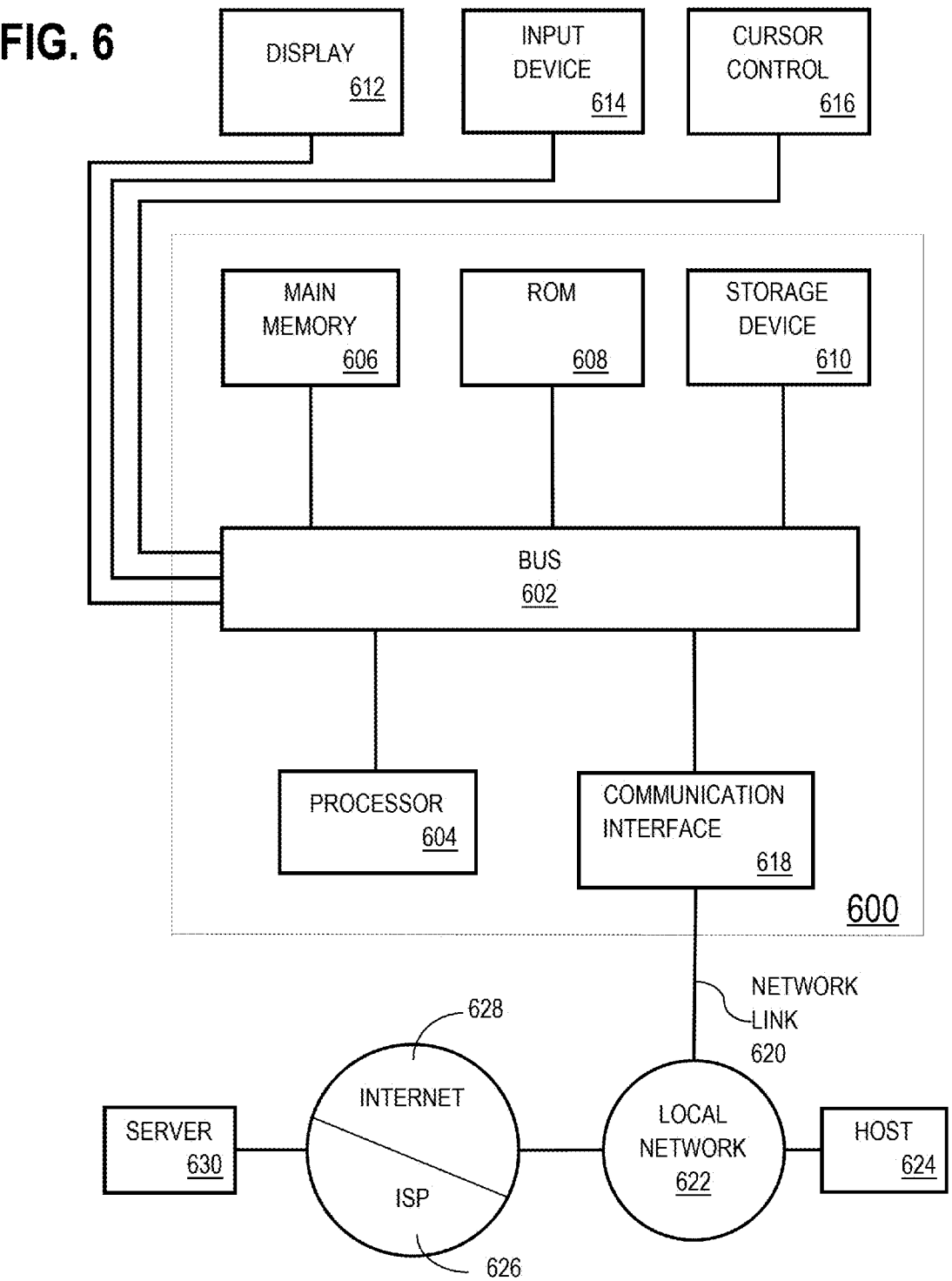

TYPE INFERENCE OPTIMIZATION

BENEFIT CLAIM

This application claims benefit to provisional patent application 62/253,855 filed on Nov. 11, 2015 titled "Type Inference Optimization".

TECHNICAL FIELD

The present disclosure relates to optimizing type inference. In particular, the present disclosure relates to propagating bounds of a first subset of one or more inference variables from a nested method invocation context to an outer method invocation context without propagating a second subset of one or more inference variables.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
3. TYPE INFERENCE
3.1 TYPE INFERENCE FOR GENERIC METHODS
3.2 TECHNICAL PROBLEMS ROOTED IN TYPE INFERENCE TECHNIQUES
3.3 TYPE INFERENCE OPTIMIZATION
4. MISCELLANEOUS; EXTENSIONS
5. HARDWARE OVERVIEW

1. GENERAL OVERVIEW

Embodiments herein describe optimization techniques for type inference.

One or more embodiments include optimizing resolution of inference variables during a compilation process. Resolution of inference variables involves propagating bounds for inference variables from a nested method invocation context to an outer method invocation context. Resolution of inference variables is optimized by propagating bounds for a first subset of inference variables without propagating bounds for a second subset of inference variables from the nested method invocation context to the outer method invocation context.

One or more embodiments described in this Specification and/or recited in the claims may not be included in this General Overview section.

2. ARCHITECTURAL OVERVIEW

Figure 1:
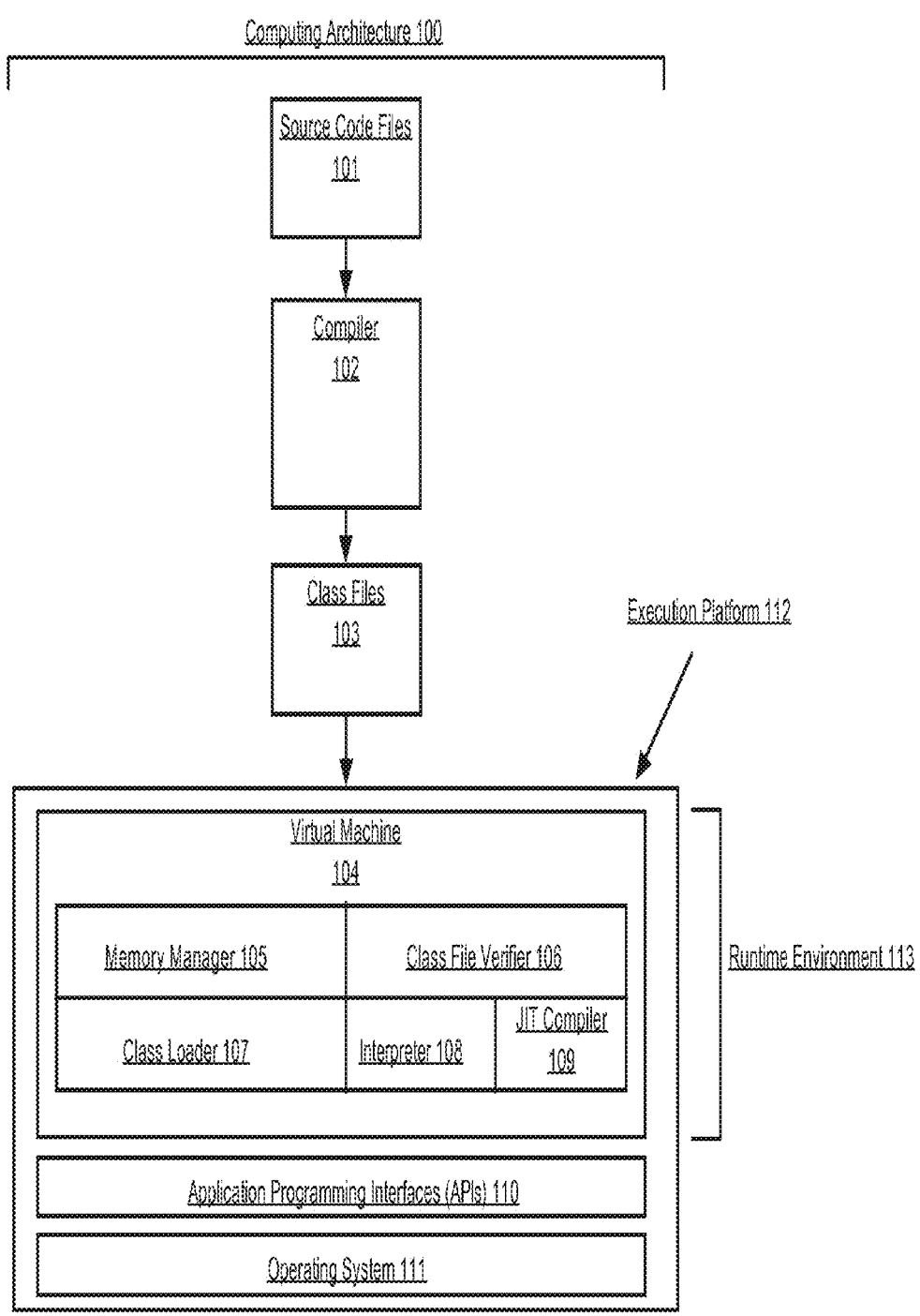
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as JAVA, C, C++, C#, RUBY, PERL, and so forth. Thus, the source code files 101 adhere to a particular set of syntactic and/or semantic rules for the associated language. For example, code written in JAVA adheres to the JAVA Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as JAVA) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JAVA Virtual Machine (JVM), the JAVA Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
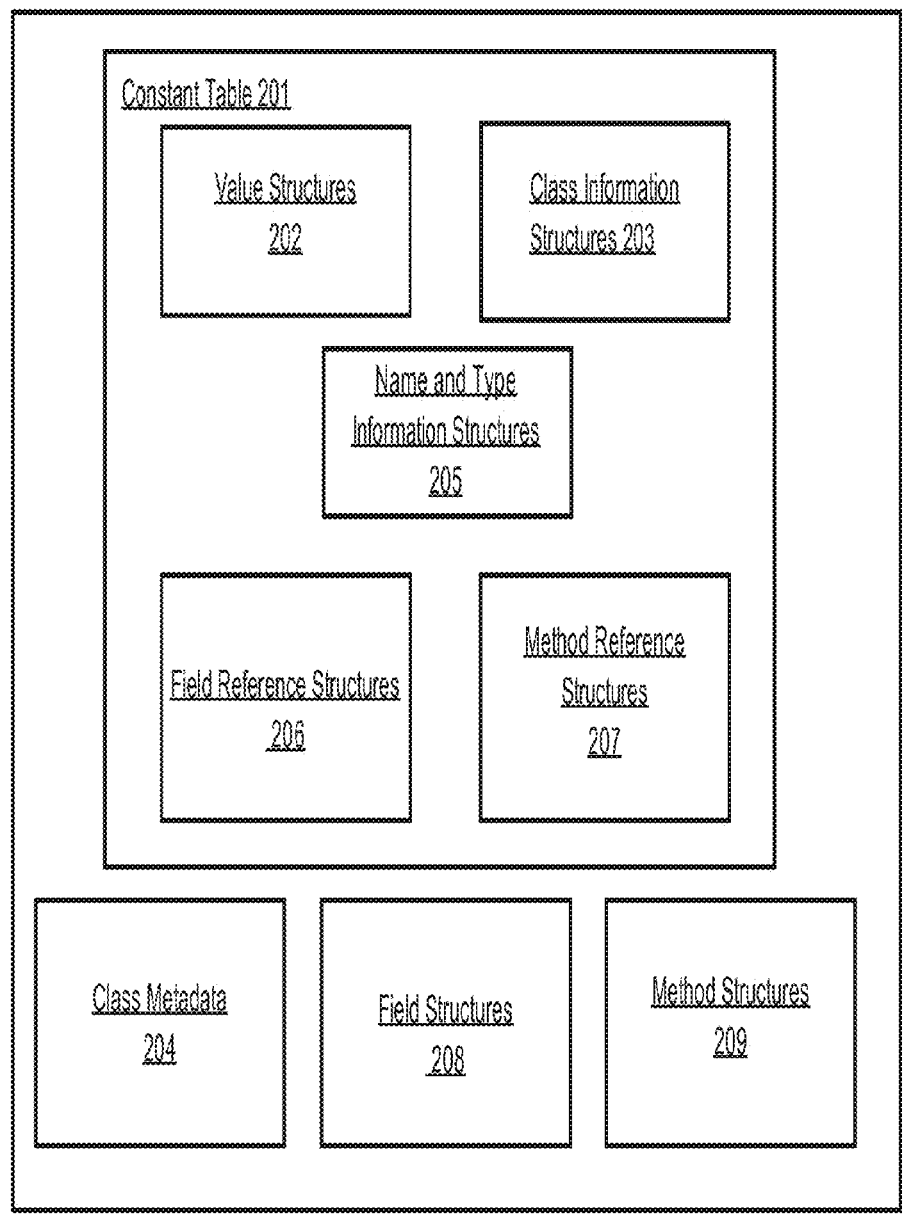
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using JAVA as an example, consider the following class:

```
class A
{
    int add12and13( ) {
        return B.addTwo(12, 13);
    }
}
```

In the above example, the JAVA method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In JAVA, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
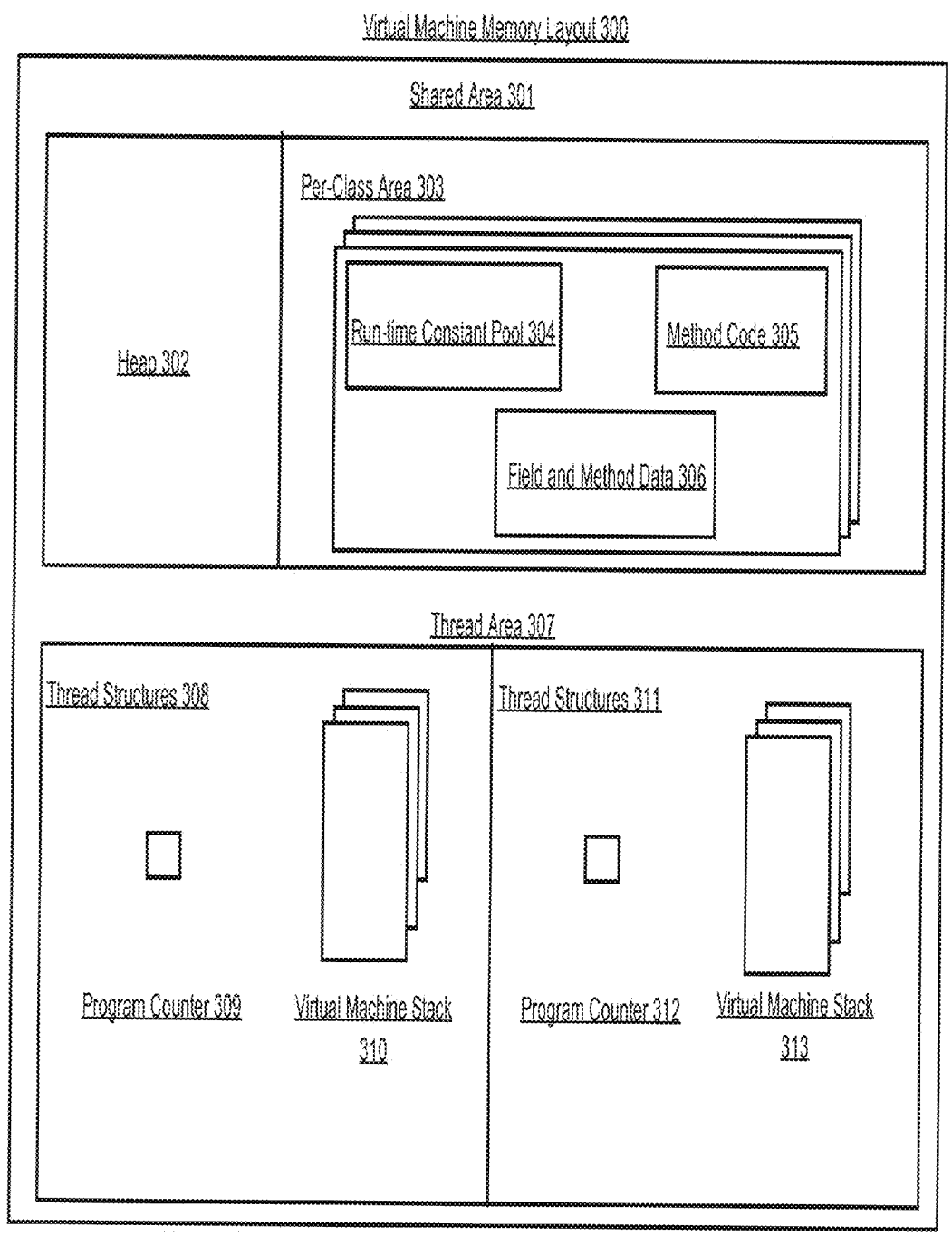
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
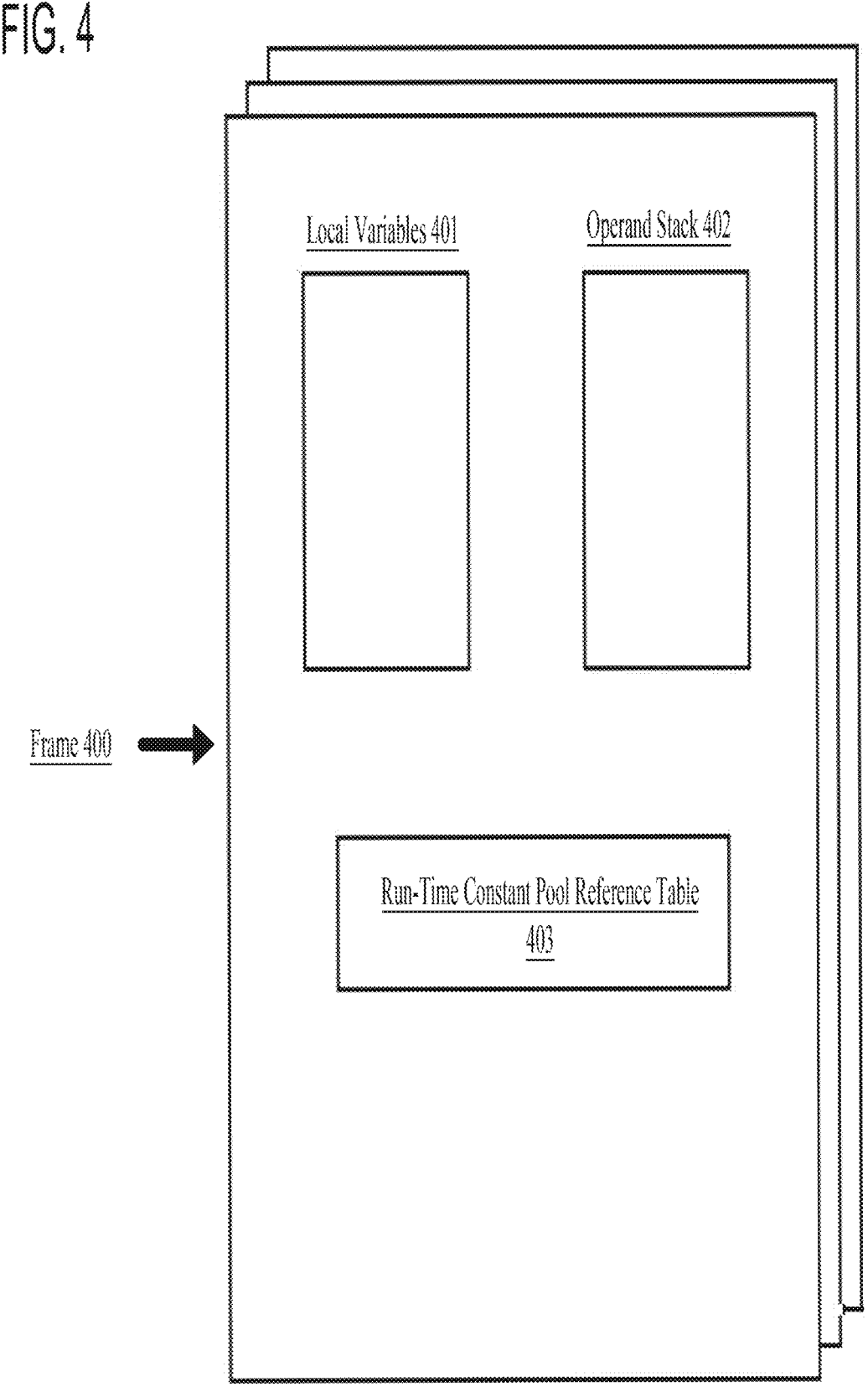
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in JAVA the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. TYPE INFERENCE

A compiler, described in detail above, performs a variety of compile-time analyses that require reasoning about types that are not yet known. Compile-time analyses include, but are not limited to, generic method applicability testing and generic method invocation type inference. Type inference is the process of reasoning about unknown types.

Type inference generally involves a compiler analyzing each method invocation and corresponding declaration to determine the type argument (or arguments) that make the invocation applicable. An inference algorithm determines the types of the arguments and, if available, the type that the result is being assigned, or returned. The inference algorithm generally tries to find the most specific type that works with all of the arguments.

Type inference generally includes three processes: Reduction, Incorporation, and Resolution. Each of the three processes are described below with reference to type variables, inference variables, constraint formulas, and bounds.

A type variable is an unqualified identifier used as a type in class, interface, method, and constructor bodies. Every type variable declared as a type parameter has a bound. If no bound is declared for a type variable, Object type is assumed. If a bound is declared, it includes either:
 a single type variable T, or
 a class or interface type T possibly followed by interface types $I_1$ & ... & $I_n$.

Inference variables are meta-variables for types. Inference variables are variable names that allow abstract reasoning about types. The term "type", as referred to herein, includes type-like syntax that contains inference variables. The term proper type excludes such "types" that mention inference variables. Assertions that involve inference variables are assertions about every proper type that can be produced by replacing each inference variable with a proper type.

Constraint formulas (referred to herein as a set of constraints) are assertions of compatibility or subtyping that may involve inference variables. A constraint formula may be, but is not necessarily, expressed in one of the following forms:
 <Expression→T>: An expression is compatible in a loose invocation context with type T.
 <S→T>: A type S is compatible in a loose invocation context with type T.
 <S<: T>: A reference type S is a subtype of a reference type T.
 <S<=T>: A type argument S is contained by a type argument T.
 <S=T>: A type S is the same as a type T, or a type argument S is the same as type argument T.
 <LambdaExpression→throws T>: The checked exceptions thrown by the body of the LambdaExpression are declared by the throws clause of the function type derived from T.
 <MethodReference→throws T>: The checked exceptions thrown by the referenced method are declared by the throws clause of the function type derived from T.

During the inference process, a set of bounds may be determined for inference variables. Bounds define the possible values of an inference variable. The set of bounds for an inference variable may be determined based on the constraints associated with the inference variable. Furthermore, bounds may be explicitly defined using bounded type parameters.

A bound may be, but is not necessarily, expressed in one of the following forms:
 S=T, where at least one of S or T is an inference variable: S is the same as T.
 S<: T, where at least one of S or T is an inference variable: S is a subtype of T.
 false: No valid choice of inference variables exists.
 $G<\alpha_1, \ldots, \alpha_n>$=capture($G<A_1, \ldots, A_n>$): The variables $\alpha_1, \ldots, \alpha_n$ represent the result of capture conversion applied to $G<A_1, \ldots, A_n>$ (where $A_1, \ldots, A_n$ may be types or wildcards and may mention inference variables).
 throws $\alpha$: The inference variable a appears in a throws clause.

Examples of bound sets include:
 {$\alpha$=string} contains a single bound, instantiating a as string.
 {Integer<: $\alpha$, Double<: $\alpha$, $\alpha$<: Object} describes two proper lower bounds and one proper upper bound for $\alpha$.
 {$\alpha$<: Iterable<?>, $\beta$<: Object, $\alpha$<: List<$\beta$>} describes a proper upper bound for each of $\alpha$ and $\beta$, along with a dependency between them.
 { } contains no bounds nor dependencies, and can be referred to as true.
 {false} expresses the fact that no satisfactory instantiation exists.

Reduction takes a compatibility assertion about an expression or type (e.g., a constraint formula) and reduces it to a set of bounds on inference variables. Often, a constraint formula reduces to other constraint formulas, which must be recursively reduced. A procedure is followed to identify these additional constraint formulas and, ultimately, to express via a bound set the conditions under which the choices for inferred types would render each constraint formula true.

Incorporation maintains a set of inference variable bounds, ensuring that these are consistent as new bounds are added. Because the bounds on one variable can sometimes impact the possible choices for another variable, this process propagates bounds between such interdependent variables.

Resolution examines the bounds on an inference variable and determines an instantiation that is compatible with those bounds. It also decides the order in which interdependent inference variables are to be resolved.

Reduction can trigger incorporation; incorporation may lead to further reduction; and resolution may cause further incorporation.

3.1 Type Inference for Generic Methods

Generic methods are methods that introduce their own type parameters. In one example, which should not be construed as limiting the scope of the claims, the syntax for a generic method may include a type parameter, inside angle brackets, and appearing before the method's return type. For static generic methods, the type parameter section may appear before the method's return type.

In the example below, the Util class includes a generic method, compare, which compares two Pair objects:

```
public class Util {
    public static <K,  V> boolean compare (Pair<K,  V> p1,
    Pair<K,  V> p2) {
        return p1.getKey ( ) .equals (p2.getKey ( ) )  &&
            p1.getValue ( ) .equals (p2.getValue ( ) ) ;
    }
}
public class Pair<K,  V>  {
    private K key;
    private V value;
    public Pair (K key, V value)  {
        this.key = key;
        this.value = value;
    }
    public void setKey (K key) {   this.key = key;   }
    public void setValue (V value) {   this.value = value;   }
    public K getKey ( )   {  return key;  }
    public V getValue ( )   {  return value;  }
}
```

The syntax for invoking the compare method may include, for example:

```
Pair<Integer,   String> p1 = new Pair< > (1,   "apple" ) ;
Pair<Integer,   String> p2 = new Pair< > (2,   "pear" ) ;
boolean same = Util.<Integer,   String>compare (p1,   p2) ;
```

The type for parameters p1 and p2 has been explicitly provided, as shown in bold above. However, this type information may be left out as shown below. A compiler will infer the type that is needed.

```
Pair<Integer,   String> p1 = new Pair< > (1,   "apple" ) ;
Pair<Integer,   String> p2 = new Pair< > (2,   "pear" ) ;
boolean same = Util.compare (p1, p2) ;
```

Additional explanations and examples for type inference is attached herewith as Appendix A.

3.2 Technical Problems Rooted in Type Inference Techniques

As bound sets are constructed, during an inference process, it is possible that new bounds are to be inferred based on the assertions of previously defined bounds. As noted above, incorporation maintains a set of inference variable bounds, ensuring that the complete set of inference variable bounds are consistent as new bounds are added. Because the bounds on one variable can sometimes impact the possible choices for another variable, the inference process propagates bounds between such interdependent variables. A first set of bounds for a first set of inference variables from a first context may be propagated to a second context. The second context may itself include a second set of inference variables with a corresponding second set of bounds (referred to herein as "new bounds") that are to be added to the first set of bounds. The incorporation process results in a set of constraints that define all of the bounds for all of the inference variables (first set of bounds for first set of inference variables combined with second set of bounds for second set of inference variables).

Two example scenarios which involve the use incorporation techniques, which should not be construed as limiting the applicability of the disclosure, are described below. In a first scenario, the bound set contains complementary pairs of bounds. The first scenario implies new constraint formulas, as specified in § 18.3.1 of Appendix A. In a second scenario, the bound set contains a bound involving capture conversion; this implies new bounds and may imply new constraint formulas, as specified in § 18.3.2 of Appendix A. In both scenarios, any new constraint formulas are reduced, and any new bounds are added to the bound set. This may trigger further incorporation; ultimately, the set will reach a fixed point during a compilation process where no further bounds can be inferred.

In an example, a set of methods are nested as illustrated below in the pseudo-code:

$X = n^{th}$ method invocation (n−1 method invocation (n−2 method invocation . . . ($3^{rd}$ method invocation ($2^{nd}$ method invocation ($1^{st}$ method invocation)))))

An object returned by the first method invocation is used as an argument of the second method invocation. An object returned by the second method invocation is used as an argument of the third method invocation . . . an object returned by the n−1 method invocation is used an argument of the $n^{th}$ method invocation. The return value of the $n^{th}$ method invocation is assigned to a variable X.

During a compilation process for the above set of code, a check must be performed to confirm that a type returned by the $n^{th}$ method invocation (outermost method) matches or is a subtype of a type of the variable X. However, a return type of the $n^{th}$ method invocation depends on a return type of the n−1 method invocation. A return type of the n−1 method invocation depends on the n−2 method invocation. The dependency is computed until a determination is made that the return type of the second method invocation depends on the return type of the first method invocation (innermost nested method).

In the above example, assume compilation of the first method invocation requires resolution of a set of inference variables. The resolution of inference variables for the first method invocation is delayed until additional information is inferred from the second method invocation which is logically an outer invocation with respect to the nested first method invocation. Resolution of inference variables for the second method invocation is delayed until additional information is inferred from a third method invocation where (a) the second method invocation is a nested method invocation within the third method invocation and (b) the third method invocation is logically an outer invocation with respect to second method invocation. Extending this explanation, the resolution of inference variables within the $1^{st}$ invocation is effectively delayed until additional information is inferred from each of the $2^{nd}$ . . . $n^{th}$ method invocations.

Conventionally, during a compilation process, the bounds determined for all inference variables corresponding to the first method invocation context are lifted or propagated to the set of bounds determined for the second method invocation context. Lifting or propagating bounds from an inner nested method invocation context to the set of bounds for an outer method invocation context ensures consistency is maintained, and that no conflicting resolutions are determined. Continuing the compilation process, the bounds determined for inference variables corresponding to the second method invocation context (which include the bounds determined for the first method invocation context) are lifted or propagated to the set of bounds determined for the third method invocation context. The process is repeated until all bounds are lifted or propagated to the set of bounds determined for the $n^{th}$ method invocation context. The resulting large set of bounds is examined during the resolution process for determining an instantiation (with the broadest scope) that is compatible with all the bounds.

The process of recursively lifting or propagating all bounds from an innermost method invocation context to an outermost method invocation context as described above is computationally expensive (for example, in terms of time and/or resources) in comparison to other compile-time analyses. Furthermore, resolving the very large set of bounds obtained for the n$^{th}$ method invocation is computationally expensive in comparison to other compile-time analyses.

An example set of code which may correspond to the pseudo-code above includes:

| | CODE BASE A |
|---|---|
| 1 | interface Predicate<T> { |
| 2 |    public boolean apply (T t) ; |
| 3 |    public boolean equals (Object o) ; |
| 4 | } |
| 5 | |
| 6 | public class Test { |
| 7 |    public static <T> Predicate<T> and (final Predicate<? |
| 8 |    super T> first, final Predicate<? super T> second) { |
| 9 |      return new Predicate<T> ( ) { |
| 10 |         public boolean apply (T t) { |
| 11 |            return first.apply (t) && |
| 12 |            second.apply (t) ; |
| 13 |         } |
| 14 |      }; |
| 15 |    } |
| 16 | |
| 17 |    public static void main (String [ ] args) { |
| 18 |      Predicate<Integer> even = new |
| 19 |      Predicate<Integer> ( ) { |
| 20 |         public boolean apply (Integer i) { |
| 21 |            return i % 2 == 0 ; |
| 22 |         } |
| 23 |      } ; |
| 24 |      public boolean X = and (even, and (even, |
| 25 |      and (even, and (even,  even) ) ) ) |
| 26 |    } |
| 27 | } |

In the above example set of code, and is a method being invoked. The and method takes two arguments: two objects of type predicate which is applicable to a type variable T or any supertype of type variable T. The type predicate which is applicable to the type variable T or any supertype of type variable T type is expressed as "Predicate<? super T>" (see declaration of and on lines 7-8). Furthermore, the and method returns an object of type predicate applicable to an inference variable T. The type predicate which is applicable to the inference variable T is expressed as "Predicate<T>" (see declaration of and on lines 7-8). The object being returned by and is set to true when both first.apply(t) and second.apply(t) return true. If either first.apply(t) or second.apply(t) return a false, the object being returned by and is set to false (see lines 11-12).

In the above set of code, even is an object of type Predicate<Integer> (a predicate which can test a condition on objects of type integer). The condition tested by even includes determining whether or not the input integer is an even integer. If the input integer is even (i.e., divisible by the number two with the remainder equaling zero), then an object of type predicate set to true is returned. If the input integer is odd, then an object of type predicate set to false is returned.

The main method invokes the and method four times in a nested manner as recited above. The innermost and method invocation (hereinafter "first and invocation") is invoked with two parameters: two objects of type Predicate< >. The object returned by the first and invocation is to be used as a parameter for invoking the second innermost and method invocation (hereinafter "second and invocation"). During compilation, a compiler must ensure that an object returned by the and method invocation may be used as a parameter for the and method invocation. Specifically, the object returned by the first and invocation must be of a subtype (or same type) of a type of the object used as a parameter for the second and invocation; this is expressed as "Predicate<T_1><: Predicate<? super T_2>" where "Predicate<T_1>" references the type of object returned by the first and invocation and "Predicate<? super T_2>" references the type of object used as an argument by the second and invocation. T_1 and T_2 are inference variables. T_1 is a meta-variable for type variable T corresponding to the first and invocation. T_2 is a meta-variable for type variable T corresponding to the second and invocation. Similarly, "Predicate<T_2><: Predicate<? super T_3>" may be determined where "Predicate<T_2>" references the type of object returned by the second and invocation and "Predicate<? super T_3>" references the type of object used as an argument by the third innermost and method invocation (hereinafter "third and invocation"). T_3 is an inference variable; T_3 is a meta-variable for type variable T corresponding to the third and invocation. Similarly, "Predicate<T_3><: Predicate<? super T_4>" may be determined where "Predicate<T_3>" references the type of object returned by the third and invocation and "Predicate<? super T_4>" references the type of object used as an argument by the fourth innermost and method invocation/ outermost and method invocation (hereinafter "fourth and invocation"). T_4 is an inference variable; T_4 is a meta-variable for type variable T corresponding to the fourth and invocation.

As noted above, conventionally, during a compilation process, the bounds determined for all inference variables corresponding to the first method invocation context are lifted or propagated to the set of bounds determined for the second method invocation context. Thereafter, the bounds for the second method invocation context (including the first method invocation context) are propagated to the next outer method invocation context. The process is repeated until bounds for all inference variables are propagated to the bounds of the outermost method invocation context. When the conventional process is applied to resolve the inference variables for the example code above, the following operations are performed:

(1) Check if parameter of method invocation is a subtype of argument of method declaration, noted as:
"Predicate<Integer><: Predicate<? super T>" which is true if
"? super T" includes Integer which is noted as
Integer<=? super T which is true if
T<: Integer which defines an upper bound for type variable T.
The upper bound for type variable T (for the innermost method invocation) is noted using inference variable T_1 as constraint T_1<: Integer where T_1 is a subtype of Integer.

(2) The constraint {T_1<: Integer} from the first method invocation context is propagated to the set of bounds for the second method invocation context in which the first method invocation/innermost method invocation is nested. Using the logic as described above with reference to the operation (1), a bound is determined for an inference variable T_2 corresponding to a type of the first parameter of the second method invocation. An upper bound for T_2 is similar to the upper bound for T_1 and is noted as T_2<: Integer. Furthermore, additional bounds for the second invocation context may result from the first method invocation. Specifically, "Predicate<T_1><: Predicate<? super T_2>" solves to "T_1<=? super T_2" which solves to "T_2<: T_1". "T_2<: T_1" may also be expressed as "T_1>: T_2". Accordingly, the constraints may include T_2<: T_1 and/or T_1>: T_2. The set of constraints determined for the second method invocation context includes {T_1<: Integer, T_2<: Integer, T_2<: T_1, T_1>: T_2}. Alternatively or additionally, the set of constraints determined for the second method invocation context may be expressed as {T_2<: T_1<: Integer}.

(3) The constraint {T_1<: Integer, T_2<: Integer, T_2<: T_1, T_1>: T_2} from the second method invocation context is propagated to the set of bounds for the third method invocation context. Using the logic as described above with reference to the operation (1), a bound is determined for an inference variable T_3 corresponding to the first parameter of the third method invocation. An upper bound for T_3 is similar to the upper bound for T_1 and is noted as T_3<: Integer. Furthermore, the additional bounds for the third method invocation context that result from the second method invocation include T_3<: T_2 and T_3<: T_1. The set of constraints determined for the third method invocation context is {T_1<: Integer, T_2<: Integer, T_3<: Integer, T_2<: T_1, T_1>: T_2, T_3<: T_2, T_2>: T_3, T_3<: T_1, T_1>: T_3}.

(4) The constraint {T_1<: Integer, T_2<: Integer, T_3<: Integer, T_2<: T_1, T_1>: T_2, T_3<: T_2, T_2>: T_3, T_3<: T_1, T_1>: T_3} from the third method invocation context is propagated to the set of bounds for the fourth method invocation context. Using the logic as described above with reference to the operation (1), a bound is determined for an inference variable T_4 corresponding to the first parameter of the fourth method invocation. An upper bound for T_4 is similar to the upper bound for T_1 and is noted as T_4<: Integer. Furthermore, the additional bounds for the fourth method invocation context that result from the third method invocation include T_4<: T_3, T_4<: T_2, T_4<: T_1, T_1>: T_4, T_2>: T_4, and T_3>: T_4. The set of constraints determined for the fourth method invocation context is {T_1<: Integer, T_2<: Integer, T_3<: Integer, T_4<: Integer, T_4<: T_3, T_4<: T_2, T_4<: T_1, T_1>: T_4, T_2>: T_4, and T_3>: T_4, T_2<: T_1, T_1>: T_2, T_3<: T_2, T_2>: T_3, T_3<: T_1, T_1>: T_3}. Alternatively or additionally, the set of constraints for the fourth method invocation context may be expressed as {T_4<: T_3<: T_2<: T_1<: Integer}.

The above example illustrates the complexities of propagating bounds for all inference variables recursively from each nested method invocation context to a corresponding outer method invocation context until an outermost method invocation context is reached. While only four nested method invocations are recited in the example above to illustrate the complexities, a larger number of nested method invocations applying type inference techniques may result in failure and/or errors by a compiler. An example set of errors are illustrated in Appendix B. The errors are generated by a compiler while attempting to compile a code set using type inference with a larger number of nested methods (as illustrated in Appendix B).

3.3 Type Inference Optimization

As noted above, a conventional compilation process for resolving inference variables involve recursively propagating bounds for all inference variables for nested method invocation contexts to bounds for outer method invocation contexts until an outermost method invocation context is reached.

One or more embodiments include optimizing resolution of inference variables during a compilation process. Resolution of inference variables involves propagating bounds for inference variables from a nested method invocation context to an outer method invocation context. Resolution of inference variables is optimized by propagating bounds for a first subset of inference variables without propagating bounds for a second subset of inference variables from the nested method invocation context to the outer method invocation context.

In an embodiment, bounds for a particular inference variable are not propagated for resolution from a nested method invocation context to an outer method invocation context when certain criteria (referred to herein as non-propagation criteria) are met.

In an embodiment, the criteria for not propagating the bounds of a particular inference variable (from a nested method invocation context to an outer method invocation context) include determining that the particular inference variable can be resolved, directly or indirectly, based on a resolution of a second inference variable. The bounds of the second inference variable are propagated from a nested method invocation context to an outer method invocation context for resolution of the second inference variable. The second inference variable may be resolved based on (a) resolution of a set of constraints to which the bounds associated with the second inference variable have been propagated and/or (b) a resolution of a third inference variable.

In an embodiment, the criteria for not propagating the bounds of a particular inference variable (from a nested method invocation context to an outer method invocation context) include determining that a same set of bounds, that are applicable to the particular inference variable, are also applicable to a second inference variable. The second inference variable is to be resolved at least by propagating the bounds of the second inference variable from a nested method invocation context to an outer method invocation context.

In an embodiment, the criteria for not propagating the bounds of a particular inference variable (from a nested method invocation context to an outer method invocation context) include determining that the particular inference variable does not represent a type of an object returned by the nested method. In an embodiment, the bounds of a particular inference variable are propagated (from a nested method invocation context to an outer method invocation context) when the particular inference variable represents a type of an object returned by the nested method.

In an embodiment, the criteria for not propagating the bounds of a particular inference variable (from a nested method invocation context to an outer method invocation context) include determining that the bounds of the particular inference variable do not depend on a type of an object returned by the nested method. If the bounds of the particular inference variable do not depend on a type of an object returned by the nested method, the particular inference variable may be resolved immediately (or at a later time) without propagating the bounds of the particular inference variable.

Figure 5:
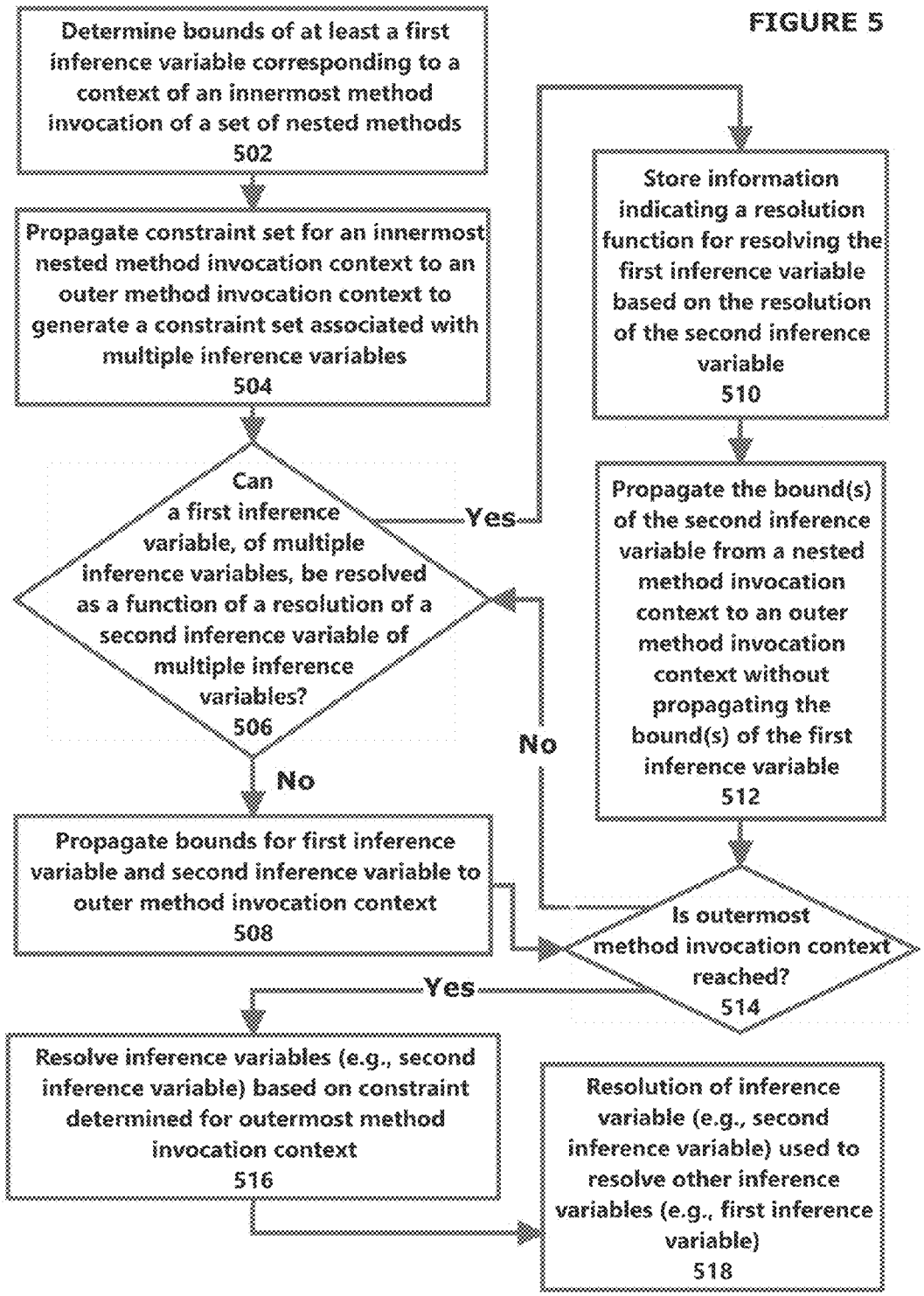
FIG. 5 illustrates a set of operations in accordance with one or more embodiments.

FIG. 5 illustrates an example set of operations for optimizing a type inference process, in accordance with one or more embodiments. One or more operations illustrated in FIG. 5 may be modified, rearranged, or omitted all together.

Accordingly, the particular sequence of operations illustrated in FIG. 5 should not be construed as limiting the scope of one or more embodiments. Examples incorporated below refer to the code base A as recited above. Specifically, the examples below describe how to optimize the type inference process when compiling code base A.

One or more embodiments include determining a set of bounds for a first inference variable corresponding to a context of an innermost method invocation of a set of nested method invocations (Operation 502). There are many different techniques (know today or later developed) for determining the bounds of an inference variable corresponding to a type of an object; any of the techniques may be used in accordance with one or more embodiments.

In the example code set above (referred to as Code Base A), the bounds for an inference variable $T\_1$ corresponding to the context of the innermost and method invocation ("first method invocation") is expressed by the following constraint set: $\{T\_1<=\text{Integer}\}$. Determining the constraint set $\{T\_1<=\text{Integer}\}$ for the first method invocation context includes:

(1) Check if parameter of first method invocation is a subtype of argument of method declaration, noted as: "Predicate<Integer><: Predicate<? super T>" which is true if "? super T" includes Integer which is noted as Integer<=? super T which is true if T<: Integer which defines an upper bound for type variable T.

The upper bound for type variable T (for the innermost method invocation) is noted using inference variable $T\_1$ as constraint $T\_1<:$ Integer where $T\_1$ is a subtype of Integer.

One or more embodiments include propagating the constraint set for an innermost nested method invocation to an outer method invocation context to generate a constraint set associated with multiple inference variables (Operation 504). The set of constraints for the innermost nested method invocation context are propagated to an outer method by defining a set of constraints for the outer method which include the set of constraints determined for the innermost nested method invocation context. Furthermore, interdependencies or relationships between (a) inference variables corresponding to the innermost nested method invocation context and (b) inference variables corresponding to an outer method invocation context are expressed as constraints.

In the example code set above (referred to as Code Base A), the constraint set corresponding to the context of the second innermost and method invocation ("second method invocation") is determined based on (a) the propagated constraint set from the first innermost method invocation context and (b) bounds for inference variables corresponding to the types of parameters introduced in the second invocation method. Determining the constraint set corresponding to the second method invocation context includes:

(2) Using the logic as described above with reference to the operation (1), bounds are determined for an inference variable $T\_2$ corresponding to a type of the first parameter of the second method invocation. An upper bound for $T\_2$ is identical to the upper bound for $T\_1$ and is noted as $T\_2<:$ Integer. Furthermore, the constraint $\{T\_1<:$ Integer$\}$ from the first method invocation context is propagated to the constraint set for the second method invocation context. Furthermore, additional constraints for the second invocation method invocation context that result from the first method invocation include $T\_2<:$ $T\_1$ and $T\_1>:$ $T\_2$. The set of constraints determined for the second method invocation context is $\{T\_1<:$ Integer, $T\_2<:$ Integer, $T\_2<:$ $T\_1$, $T\_1>:$ $T\_2\}$. Alternatively or additionally, the set of constraints for the second method invocation context may be expressed as $\{T\_2<:$ $T\_1<:$ Integer$\}$.

As stated above, a constraint set for an outer method invocation context is associated with multiple inference variables including at least a first inference variable and a second inference variable. One or more embodiments include determining whether a first inference variable can be resolved as a function of a second inference variable (Operation 506).

In one example, determining that a first inference variable can be resolved as a function of a second inference variable may include, for example, determining that a set of bounds for the first inference variable are identical to a set of bounds for the second inference variable at a time when this determining operation is performed. In addition to the identical set of bounds, the first inference variable and/or the second inference variable may be associated with additional set(s) of bounds.

In the example code set above (referred to as Code Base A), a determination may be made that $T\_1$ can be resolved based on a resolution of $T\_2$. Alternatively or additionally, a determination may be made that $T\_2$ may be resolved based on a resolution of $T\_1$. Determining that $T\_1$ may be resolved based on a resolution of $T\_2$ involves comparing a set of bounds for $T\_1$ with a set of bounds for $T\_2$. If a set of bounds for $T\_1$ are determined to be identical to the set of bounds for $T\_2$, then the resolution of one of $T\_1$ or $T\_2$ can be used to resolve the other of $T\_1$ or $T\_2$. The bounds determined for $T\_1$ include $\{T\_1<:$ Integer, $T\_2<:$ $T\_1$, $T\_1>:$ $T\_2\}$. The bounds for $T\_2$ include $\{T\_2<:$ Integer, $T\_2<:$ $T\_1$, $T\_1>:$ $T\_2\}$. An upper bound for both $T\_1$ and $T\_2$ is Integer. Furthermore, $T\_1$ is an upper bound for $T\_2$. Based on the similarity between the bounds for $T\_1$ and $T\_2$, a determination may be made $T\_1$ may be resolved based on a resolution of $T\_2$ and/or $T\_2$ may be resolved based on a resolution of $T\_1$.

If a first inference variable cannot be resolved as a function of a resolution of a second inference variable, then the bounds of both the first inference variable and the second inference variable are propagated to an outer method invocation context (Operation 508).

If a first inference variable can be resolved as a function of a resolution of a second inference variable, then information is stored indicating a resolution function for resolving the first inference variable based on the resolution of the second inference variable (Operation 510). The resolution function may or may not indicate an equivalency relationship between the resolution of two inference variables. For example, the resolution function may simply indicate that the resolution of the second inference variable is to be used as the resolution of the first inference variable. Alternatively, the resolution function may indicate how to determine upper bounds and/or lower bounds for resolving the first inference variable based on the resolution of the second inference variable. If an equivalency relationship (e.g., $T\_1==T\_2$) is determined for two inference variables, then the resolution function may simply indicate that the resolution of one inference variable is to be used as the resolution for the other inference variable.

In the example code set above (referred to as Code Base A), information may be stored indicating that the resolution of $T\_1$ is to be used as the resolution of $T\_2$. Alternatively, information may be stored that the resolution of $T\_2$ is to be used as the resolution of $T\_1$.

In an embodiment, any number of inference variables may be resolved as function of the resolution one particular inference variable. For example, three different inference variables may be associated with an identical set of bounds. Resolution of one of the three inference variables may be used to resolve the remaining two inference variables.

In an embodiment, the bound(s) of the second inference variable are propagated from a nested method invocation context to an outer method invocation context without propagating the bound(s) of the first inference variable (Operation 512).

In an example, a determination is made that the first inference variable may be resolved as a function of a resolution of a second inference variable. In this case, the bounds for the second inference variable may be propagated for resolution from a nested method invocation context to an outer method invocation context. The bounds for the first inference variable are not propagated from the nested method invocation context to the outer method invocation context.

In the example code set above (referred to as Code Base A), the constraint set determined in the context of the second method invocation included: {T_1<: Integer, T_2<: Integer, T_2<: T_1, T_1>: T_2}. The constraint set includes bounds for both T_1 and T_2. Since T_1 may be resolved as a function of T_2, resolving T_2 via propagation of bounds of T_2 to an outer method is sufficient (without propagation of bounds of T_1). T_1 may be resolved after and based on the resolution of T_2. Accordingly, the bounds associated solely with T_2 are propagated to an outer method invocation context without propagation of the bounds associated with T_1. In this example, instead of propagating the entire constraint set (as performed conventionally), only the constraint set {T_2<: Integer} is propagated to an outer method invocation context (third method invocation context). Based on the propagated constraint set {T_2<: Integer} and additional constraints associated with T_3, the constraint set determined in the context of the third method invocation is determined to include: {T_3<: Integer, T_2<: Integer, T_3<: T_2, T_2>: T_3}. The constraint set includes bounds for both T_3 and T_2 but does not include bounds for T_1. Since T_2 may be resolved as a function of T_3, resolving T_3 via propagation of bounds of T_3 to an outer method is sufficient (without propagation of bounds of T_2). T_2 may be resolved after and based on the resolution of T_3. Accordingly, the bounds associated solely with T_3 are propagated to an outer method invocation context without propagation of the bounds associated with T_2. In this example, instead of propagating the entire constraint set (as performed conventionally), only the constraint set {T_3<: Integer} is propagated to an outer method invocation context.

In an embodiment, a determination is made if the outermost method invocation context has been reached (Operation 514). As noted above, the bounds for one or more inference variables are propagated to an outer method invocation context corresponding to a particular method invocation. A determination is made if the particular method invocation, to which the bounds are propagated, is an outermost method invocation.

In the example code set above (referred to as Code Base A), repeating operations 506-514 leads to obtaining a constraint set for the context of an outermost and method invocation (fourth method invocation). The constraint set for the fourth method invocation context is determined based on the propagated constraint set (bounds for a subset of inference variables) from the third method invocation context and bounds for inference variables corresponding to the types of parameters introduced in the fourth invocation method. Determining the constraint set corresponding to the fourth method invocation context includes:

(3) Using the logic as described above with reference to the operation (1), a bound is determined for an inference variable T_4 corresponding to a type of the first parameter of the fourth method invocation. An upper bound for T_4 is identical to the upper bound for T_1 and is noted as T_4<: Integer. Furthermore, the constraint {T_3<: Integer} corresponding to bounds of a subset of inference variables from the third method invocation context is propagated to the set of bounds for the fourth method invocation context. Furthermore, additional bounds for the fourth invocation that result from the third method invocation context include T_4<: T_3 and T_3>: T_4. Finally, the expected type Predicate<Integer> results to the constraint T_4==Integer. Accordingly, the set of constraints determined for the fourth method invocation is {T_4==Integer, T_4<: Integer, T_3<: Integer, T_4<: T_3, T_3>: T_4}. This constraint set for the fourth method invocation context (outermost method invocation context) does not include bounds corresponding to T_1 or T_2. As a result of the optimization both generation and resolution of the constraint set for the outermost method invocation context has been significantly optimized resulting in reduction of time and/or resources necessary for resolution.

In an embodiment, the set of constraints determined for the outermost method invocation context is resolved (Operation 516). Any known and/or later developed techniques for resolving a constraint set to determine the resolution of a set of inference variables may be used.

In the example code set above (referred to as Code Base A), the set of constraints determined for the fourth method invocation is {T_4==Integer, T_4<: Integer, T_3<: Integer, T_4<: T_3, T_3>: T_4}. This set of constraints may be resolved to T<d==Integer. Based on the set of constraints for the fourth method invocation context, we can further conclude that T_3 Integer.

In an embodiment, the resolution of an inference variable can be used to resolve other inference variables (Operation 518). As noted above, the bounds of a particular inference variable from an inner method invocation context may be propagated to an outer method invocation context for resolution without propagation of the bounds of another inference variable(s) from the inner method invocation context. The resolution of the particular inference variable, once determined, may be applied to a resolution function to determine the resolution of the other inference variable(s).

In the example code set above (referred to as Code Base A), inference variable T_3 is resolved to T_3==Integer. The resolution of T_3 is applied to a resolution function for T_2 to conclude T_2==Integer. Furthermore, the resolution of T_2 is applied to a resolution function for T_1 to conclude T_1==Integer. Accordingly, inference variables T_1 and T_2 are resolved quickly and efficiently without the bounds of T_1 and T_2 being recursively propagated to an outermost method invocation context.

Other operations (not illustrated in FIG. 5) may be involved in determining whether or not to propagate bounds for inference variables. As noted above, the criteria for not propagating the bounds of a particular inference variable (from a nested method invocation context to an outer method invocation context) include determining (a) that the particular inference variable does not represent a type of an object returned by the nested method and (b) that the bounds of the particular inference variable do not depend on a type of an object returned by the nested method. In another example code base B (as illustrated below), a type variable Z does not represent a type of an object returned by any method and does not depend on a type of an object returned by any method.

| | CODE BASE B |
|---|---|
| 1 | interface Predicate<T> { |
| 2 |    public boolean apply (T t) ; |
| 3 |    public boolean equals (Object o) ; |
| 4 | } |
| 5 | |
| 6 | public class Test { |
| 7 |    public static <T, Z> Predicate<T> and (Predicate<Z> |
| 8 |    unused, final Predicate<? super T> first, final |
| 9 |    Predicate<? super T> second) { |
| 10 |      return new Predicate<T> ( ) { |
| 11 |         public boolean apply (T t) { |
| 12 |            return first.apply (t) && |
| 13 |            second.apply (t) ; |
| 14 |         } |
| 15 |      } ; |
| 16 |    } |
| 17 | |
| 18 |    public static void main (String [ ] args) { |
| 19 |      Predicate<Integer> even = new |
| 20 |      Predicate<Integer> ( ) { |
| 21 |         public boolean apply (Integer i) { |
| 22 |            return i % 2 == 0; |
| 23 |         } |
| 24 |      }; |
| 25 |      public boolean X = and (even, even, and (even, |
| 26 |      even, and (even, even, and (even, even, even) ) ) ) |
| 27 |    } |
| 28 | } |

Referring to code base B, Z_1 is an inference variable representing a type of the first parameter of the innermost invocation of the method and (first and invocation). Z_1 does not represent a type of an object returned by the first and invocation and does not depend on a type of an object returned by first and invocation. Therefore, any resolution for Z_1 will not conflict with (a) any resolution for a type of an object returned by the first and invocation or (b) any resolution of any other inference variable from other method invocation contexts. As noted above, bounds for a particular inference variable from an inner nested method invocation context are typically propagated to the set of bounds for an outer method invocation context to ensure consistency is maintained, and that no conflicting resolutions are determined. Since conflict between resolution of Z_1 and resolution of other inference variables in other method invocation contexts is not possible, Z_1 may be resolved without propagation of the bounds of Z_1 to outer method contexts. Thus, Z_1 may be resolved immediately (or later) without the propagation of the bounds of Z_1 from the innermost method invocation context to the second innermost method invocation context.

4. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a set of methods comprising a nested method and an outer method, wherein the nested method is nested inside the outer method, the nested method is associated with a nested method invocation context, and the outer method is associated with an outer method invocation context;
   identifying a set of bounds for each of a plurality of inference variables associated with the nested method invocation context;
   based on the set of bounds for each of the plurality of inference variables, determining that a first inference variable, of the plurality of inference variables, is resolvable based on a resolution of a second inference variable of the plurality of inference variables;
   responsive at least to determining that the first inference variable is resolvable based on the resolution of the second inference variable: propagating the bounds for the second inference variable from the nested method invocation context to the outer method invocation context without propagating the bounds for the first inference variable from the nested method invocation context to the outer method invocation context;

determining a set of constraints associated with the outer method invocation context, the set of constraints (a) including the bounds for the second inference variable associated with the nested method invocation context, and (b) not including the bounds for the first inference variable associated with the nested method invocation context;

determining a resolution for the second inference variable based on the set of constraints associated with the outer method invocation context; and determining a resolution for the first inference variable based on the resolution for the second inference variable;

wherein the resolution for the first inference variable and the resolution for the second inference variable are usable for generating a representation of the set of methods that is executable in a machine environment.

2. The medium of claim 1, wherein determining that the first inference variable is resolvable based on the resolution of the second inference variable comprises comparing the bounds for the first inference variable with the bounds for the second inference variable.

3. The medium of claim 1, wherein determining that the first inference variable is resolvable based on the resolution of the second inference variable comprises determining that the bounds for the first inference variable are equivalent to the bounds for the second inference variable.

4. The medium of claim 1, wherein the propagating operation is further responsive to (a) determining that the first inference variable is not associated with a type of an object returned by the nested method corresponding to the nested method invocation context and (b) determining that the second inference variable is associated with the type of the object returned by the nested method.

5. The medium of claim 1, wherein the operations further comprise:
  determining that a third inference variable, of the plurality of inference variables, does not depend on a type of an object returned by the nested method; and
  responsive to determining that the third inference variable does not depend on the type of the object returned by the nested method: resolving the third inference variable without propagating the bounds for the third inference variable from the nested method invocation context to the outer method invocation context.

6. The medium of claim 1, wherein determining that the first inference variable is resolvable based on the resolution of the second inference variable comprises identifying a resolution function which may be used to resolve the first inference variable based on the resolution of the second inference variable.

7. The medium of claim 1, wherein determining that the first inference variable is resolvable based on the resolution of the second inference variable comprises determining that the bounds for the first inference variable may be determined as a function of the resolution of the second inference variable.

8. The medium of claim 1, wherein the resolution for the first inference variable and the resolution for the second inference variable are usable for determining a class to be loaded into a runtime environment.

9. The medium of claim 1, wherein the resolution for the first inference variable results in a most specific type, for the first inference variable, that is consistent with resolutions for each of the plurality of inference variables.

10. A method comprising:
  identifying a set of methods comprising a nested method and an outer method, wherein the nested method is nested inside the outer method, the nested method is associated with a nested method invocation context, and the outer method is associated with an outer method invocation context;
  identifying a set of bounds for each of a plurality of inference variables associated with the nested method invocation context;
  based on the set of bounds for each of the plurality of inference variables, determining that a first inference variable, of the plurality of inference variables, is resolvable based on a resolution of a second inference variable of the plurality of inference variables;
  responsive at least to determining that the first inference variable is resolvable based on the resolution of the second inference variable: propagating the bounds for the second inference variable from the nested method invocation context to the outer method invocation context without propagating the bounds for the first inference variable from the nested method invocation context to the outer method invocation context;
  determining a set of constraints associated with the outer method invocation context, the set of constraints (a) including the bounds for the second inference variable associated with the nested method invocation context, and (b) not including the bounds for the first inference variable associated with the nested method invocation context;
  determining a resolution for the second inference variable based on the set of constraints associated with the outer method invocation context; and
  determining a resolution for the first inference variable based on the resolution for the second inference variable;
  wherein the resolution for the first inference variable and the resolution for the second inference variable are usable for generating a representation of the set of methods that is executable in a machine environment;
  wherein the method is performed by at least one device including a hardware processor.

11. The method of claim 10, wherein determining that the first inference variable is resolvable based on the resolution of the second inference variable comprises comparing the bounds for the first inference variable with the bounds for the second inference variable.

12. The method of claim 10, wherein determining that the first inference variable is resolvable based on the resolution of the second inference variable comprises determining that the bounds for the first inference variable are equivalent to the bounds for the second inference variable.

13. The method of claim 10, wherein the propagating operation is further responsive to (a) determining that the first inference variable is not associated with a type of an object returned by the nested method corresponding to the nested method invocation context and (b) determining that the second inference variable is associated with the type of the object returned by the nested method.

14. The method of claim 10, wherein the method further comprises:
  determining that a third inference variable, of the plurality of inference variables, does not depend on a type of an object returned by the nested method; and responsive to determining that the third inference variable does not depend on the type of the object returned by the nested method: resolving the third inference variable without propagating the bounds for the third inference variable from the nested method invocation context to the outer method invocation context.

15. The method of claim 10, wherein determining that the first inference variable is resolvable based on the resolution of the second inference variable comprises identifying a resolution function which may be used to resolve the first inference variable based on the resolution of the second inference variable.

16. The method of claim 10, wherein determining that the first inference variable is resolvable based on the resolution of the second inference variable comprises determining that the bounds for the first inference variable may be determined as a function of the resolution of the second inference variable.

17. A system comprising:
at least one device including a hardware processor;
the system being configured to perform operations comprising:
identifying a set of methods comprising a nested method and an outer method, wherein the nested method is nested inside the outer method, the nested method is associated with a nested method invocation context, and the outer method is associated with an outer method invocation context;
identifying a set of bounds for each of a plurality of inference variables associated with the nested method invocation context;
based on the set of bounds for each of the plurality of inference variables, determining that a first inference variable, of the plurality of inference variables, is resolvable based on a resolution of a second inference variable of the plurality of inference variables;
responsive at least to determining that the first inference variable is resolvable based on the resolution of the second inference variable: propagating the bounds for the second inference variable from the nested method invocation context to the outer method invocation context without propagating the bounds for the first inference variable from the nested method invocation context to the outer method invocation context;
determining a set of constraints associated with the outer method invocation context, the set of constraints (a) including the bounds for the second inference variable associated with the nested method invocation context, and (b) not including the bounds for the first inference variable associated with the nested method invocation context;

determining a resolution for the second inference variable based on the set of constraints associated with the outer method invocation context; and
determining a resolution for the first inference variable based on the resolution for the second inference variable;
wherein the resolution for the first inference variable and the resolution for the second inference variable are usable for generating a representation of the set of methods that is executable in a machine environment.

18. The system of claim 17, wherein determining that the first inference variable is resolvable based on the resolution of the second inference variable comprises comparing the bounds for the first inference variable with the bounds for the second inference variable.

19. The system of claim 17, wherein determining that the first inference variable is resolvable based on the resolution of the second inference variable comprises determining that the bounds for the first inference variable are equivalent to the bounds for the second inference variable.

20. The system of claim 17, wherein the propagating operation is further responsive to (a) determining that the first inference variable is not associated with a type of an object returned by the nested method corresponding to the nested method invocation context and (b) determining that the second inference variable is associated with the type of the object returned by the nested method.

21. The system of claim 17, wherein the operations further comprise:
determining that a third inference variable, of the plurality of inference variables, does not depend on a type of an object returned by the nested method; and
responsive to determining that the third inference variable does not depend on the type of the object returned by the nested method: resolving the third inference variable without propagating the bounds for the third inference variable from the nested method invocation context to the outer method invocation context.

22. The system of claim 17, wherein determining that the first inference variable is resolvable based on the resolution of the second inference variable comprises one or more of:
identifying a resolution function which may be used to resolve the first inference variable based on the resolution of the second inference variable;
determining that the bounds for the first inference variable may be determined as a function of the resolution of the second inference variable.

* * * * *

UNITED STATES PATENT AND TRADEMARK OFFICE
CERTIFICATE OF CORRECTION

PATENT NO. : 10,001,978 B2
APPLICATION NO. : 14/973129
DATED : June 19, 2018
INVENTOR(S) : Cimadamore et al.

Page 1 of 1

It is certified that error appears in the above-identified patent and that said Letters Patent is hereby corrected as shown below:

In the Specification

In Column 12, Line 23, delete "a appears" and insert -- α appears --, therefor.

In Column 12, Line 26, delete "a as" and insert -- α as --, therefor.

In Column 15, Line 63, delete "Predicate< >." and insert -- Predicate<Integer>. --, therefor.

In Column 16, Line 48, delete ""? super T"" and insert -- '? super T' --, therefor.

In Column 19, Line 26, delete ""? super T"" and insert -- '? super T' --, therefor.

Signed and Sealed this
Fifth Day of February, 2019

Andrei Iancu
*Director of the United States Patent and Trademark Office*